(12) United States Patent
Brauer et al.

(10) Patent No.: US 10,600,177 B2
(45) Date of Patent: Mar. 24, 2020

(54) NUISANCE REDUCTION USING LOCATION-BASED ATTRIBUTES

(71) Applicant: KLA-Tencor Corporation, Milpitas, CA (US)

(72) Inventors: Bjorn Brauer, Beaverton, OR (US); Junqing Huang, Fremont, CA (US); Lisheng Gao, Saratoga, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 148 days.

(21) Appl. No.: 15/858,511

(22) Filed: Dec. 29, 2017

(65) Prior Publication Data

US 2019/0050974 A1 Feb. 14, 2019

Related U.S. Application Data

(60) Provisional application No. 62/542,970, filed on Aug. 9, 2017.

(51) Int. Cl.
*G06T 7/00* (2017.01)
*G06T 7/73* (2017.01)

(52) U.S. Cl.
CPC ............... *G06T 7/001* (2013.01); *G06T 7/74* (2017.01); *G06T 2207/10061* (2013.01); *G06T 2207/20068* (2013.01); *G06T 2207/30148* (2013.01)

(58) Field of Classification Search
CPC . G06T 2207/10061; G06T 2207/20068; G06T 2207/30148; G06T 7/001; G06T 7/74
See application file for complete search history.

(56) References Cited

U.S. PATENT DOCUMENTS

| | | | |
|---|---|---|---|
| 2002/0171051 A1* | 11/2002 | Nakagaki | G01N 21/9501 250/559.4 |
| 2003/0053675 A1 | 3/2003 | Kuwabara | |
| 2008/0205745 A1 | 8/2008 | Chen et al. | |
| 2008/0317329 A1 | 12/2008 | Shibuya et al. | |
| 2014/0192352 A1 | 7/2014 | Bamba et al. | |
| 2015/0043804 A1 | 2/2015 | Huang et al. | |
| 2015/0093014 A1* | 4/2015 | Goren | G01N 21/9501 382/149 |

OTHER PUBLICATIONS

ISA/KR, International Search Report and Written Opinion for PCT/US2018/045304 dated Dec. 3, 2018.

* cited by examiner

*Primary Examiner* — Nirav G Patel
(74) *Attorney, Agent, or Firm* — Hodgson Russ LLP

(57) ABSTRACT

Methods and systems are disclosed that provide nuisance reduction in images, such as semiconductor images that include one or more metal lines. A potential defect is correlated against pixel grey level intensity charts for two perpendicular axes. A position of the potential defect relative to a pattern, such as a metal line, is determined along the two axes. The potential defect can be classified as a defect of interest or nuisance event.

19 Claims, 4 Drawing Sheets

NUISANCE REDUCTION USING LOCATION-BASED ATTRIBUTES

CROSS-REFERENCE TO RELATED APPLICATIONS

This application claims priority to the provisional patent application filed Aug. 9, 2017 and assigned U.S. App. No. 62/542,970, the disclosure of which is hereby incorporated by reference.

FIELD OF THE DISCLOSURE

This disclosure relates to nuisance reduction in defect analysis.

BACKGROUND OF THE DISCLOSURE

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

Fabricating semiconductor devices, such as logic and memory devices, typically includes processing a semiconductor wafer using a large number of fabrication processes to form various features and multiple levels of the semiconductor devices. For example, lithography is a semiconductor fabrication process that involves transferring a pattern from a reticle to a photoresist arranged on a semiconductor wafer. Additional examples of semiconductor fabrication processes include, but are not limited to, chemical-mechanical polishing (CMP), etch, deposition, and ion implantation. Multiple semiconductor devices may be fabricated in an arrangement on a single semiconductor wafer and then separated into individual semiconductor devices.

Inspection processes are used at various steps during a semiconductor manufacturing process to detect defects on wafers to promote higher yield in the manufacturing process and thus higher profits. Inspection has always been an important part of fabricating semiconductor devices. However, as the dimensions of semiconductor devices decrease, inspection becomes even more important to the successful manufacture of acceptable semiconductor devices because smaller defects can cause the devices to fail. For instance, as the dimensions of semiconductor devices decrease, detection of defects of decreasing size has become necessary since even relatively small defects may cause unwanted aberrations in the semiconductor devices.

Finding a defect of interest (DOI) can be challenging. High nuisance rates are a common problem. Nuisance events can be misidentified as DOI or can cause a DOI to be incorrectly identified as a nuisance. Thus, nuisance events can make it difficult or even impossible to track DOI or monitor excursions. Consequently, killer defects that may jeopardize yield may be missed.

Nuisance events are common with wafers that include metal lines or lines of other materials. Due to the resolution limits of optical tools, the lines can appear blurry. This blurriness makes it difficult to determine if the defect falls on the line or not.

Previous techniques to find DOI on a wafer with metal lines were based on pattern (context) based attributes, such as by using the grey level. Pattern based attributes compare the optical image of a pattern to a nuisance pattern. The nuisance pattern is known to cause multiple nuisance events. These patterned based attribute techniques tend to be too inaccurate to sort patterns with high versus low numbers of nuisance events because these techniques require larger field of views and are limited to how well the patterns are optically resolved. The resolution using these techniques typically was an order of magnitude short. For example, defects were identified ±4 pixels. Thus, if each pixel was 50 nm, then defects were identified ±200 nm.

Another previous technique was based on defining very small care areas (CAs) around nuisance structures to filter out the nuisance structures. However, creating such CAs is time-consuming. The time required to perform this technique can be extremely large when rules need to be created to search for such CAs.

Therefore, an improved technique and system for nuisance reduction is needed.

BRIEF SUMMARY OF THE DISCLOSURE

In a first instance, a method is provided. The method comprises providing an image of a wafer that includes a line of material. The image has an x-axis and a y-axis perpendicular to the x-axis. Using a processor, a potential defect is correlated against an x-axis pixel grey level intensity chart of the image. Using the processor, the potential defect is correlated against a y-axis pixel grey level intensity chart of the image. Using the processor, a position of the potential defect is determined relative to the line of material on the wafer along the x-axis and along the y-axis based on a point of the potential defect on the x-axis pixel grey level intensity chart and a point of the potential defect on the y-axis pixel grey level intensity chart, respectively. Using the processor, the potential defect is classified as a defect of interest or a nuisance event based on the position of the potential defect. The defect of interest is a non-zero distance apart from the line of material along both the x-axis and y-axis. The nuisance event is on the line of material along at least one of the x-axis or the y-axis. The line of material may be a metal line or some other material.

Both the x-axis pixel grey level intensity chart and the y-axis pixel grey level intensity chart can intersect the potential defect.

Both the x-axis pixel grey level intensity chart and the y-axis pixel grey level intensity chart can include a threshold. The threshold can be used to determine the line of material, such as existence of and/or a location of the line of material.

The method can further include identifying, using the processor, the potential defect in the image.

The method can further include determining, using the processor, a location of the line of material in the image.

Determining the position can includes interpolating a location of the line of material; interpolating a location of the potential defect; and determining a distance between the location of the line of material and the location of the potential defect.

The image may be 32 pixels in the x-axis and 32 pixels in the y-axis, though other dimensions are possible.

Determining the position may be based on a center of the potential defect.

The method can further include generating, using the processor, the x-axis pixel grey level intensity chart and the y-axis pixel grey level intensity chart.

In a second instance, a computer program product is provided. The computer program product comprises a non-transitory computer readable storage medium having computer readable program embodied therewith. The computer readable program is configured to carry out the method of any embodiment of the first instance.

In a third instance, a system is provided. The system comprises a processor in electronic communication with an electronic storage medium and a wafer inspection tool. The processor is configured to execute instructions that: correlate a potential defect against an x-axis pixel grey level intensity chart of the image of a wafer that includes a line of material; correlate the potential defect against a y-axis pixel grey level intensity chart of the image; determine a position of the potential defect relative to the line of material on the wafer along the x-axis and along the y-axis based on a point of the potential defect on the x-axis pixel grey level intensity chart and a point of the potential defect on the y-axis pixel grey level intensity chart, respectively; and classify the potential defect as a defect of interest or a nuisance event based on the position of the potential defect. The image has an x-axis and a y-axis perpendicular to the x-axis. The defect of interest is a non-zero distance apart from the line of material along both the x-axis and y-axis. The nuisance event is on the line of material along at least one of the x-axis or the y-axis. The line of material may be a metal line or some other material.

Both the x-axis pixel grey level intensity chart and the y-axis pixel grey level intensity chart can include a threshold. The threshold can be used to determine the line of material, such as existence of and/or a location of the line of material.

The processor can be further configured to execute instructions that identify the potential defect in the image.

Both the x-axis pixel grey level intensity chart and the y-axis pixel grey level intensity chart may intersect the potential defect.

The processor can be further configured to execute instructions that generate the x-axis pixel grey level intensity chart and the y-axis pixel grey level intensity chart.

The processor may be incorporated in the wafer inspection tool. The wafer inspection tool can generate the image. For example, the wafer inspection tool may be a scanning electron microscope.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Embodiments disclosed herein provide an accurate and fast technique to provide nuisance reduction in images, especially for semiconductor images that include one or more lines of materials, such as metal lines. Reducing the number of nuisance events can improve yield monitoring in a semiconductor manufacturing facility.

Figure 1:
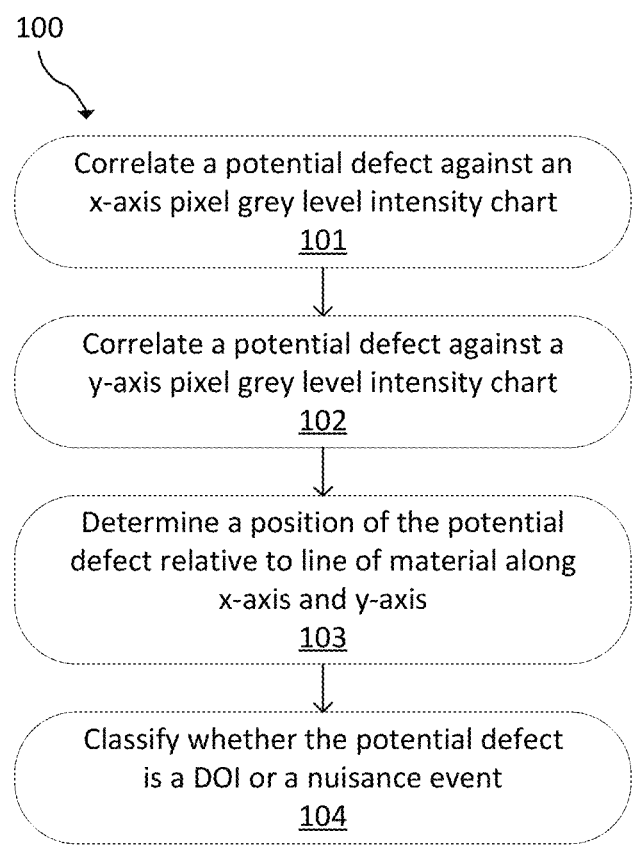
FIG. 1 is a flowchart of an embodiment in accordance with the present disclosure.

FIG. 1 is a flowchart of a method 100. An image of a wafer that includes one or more lines of material is provided. Lines of material may have a strong projection along the x-axis and/or y-axis. The lines of material may be, for example, metal lines, semiconductor lines, or insulator lines. The image has an x-axis and a y-axis perpendicular to the x-axis. For example, the image may be 32 pixels in the x-axis and 32 pixels in the y-axis. In other examples, the image may be 64×64 pixels, 128×128 pixels, 256×256 pixels, or 512×512 pixels, including all integer values and ranges between 32 pixels and 512 pixels, though other image sizes are possible. The image may be a patch image.

A potential defect can be identified in the image. An x-axis pixel grey level intensity chart and a y-axis pixel grey level intensity chart based on the image are generated or received. The x-axis pixel grey level intensity chart and the y-axis pixel grey level intensity chart measure pixel grey level intensity on a line across the image. The average grey level of all pixels along the line is calculated. This is performed for all the lines and the resulting numbers are plotted, such as in a projection.

The potential defect is correlated against the x-axis pixel grey level intensity chart of the image at 101. The potential defect is correlated against the y-axis pixel grey level intensity chart of the image at 102. In an instance, the exact defect coordinate can be interpolated. The distance between this coordinate and the peak or valley in the projection plot can then be calculated to extract the exact distance between the defect and the line of material.

At 103, a position of the potential defect is determined relative to the line of material or lines of material along the x-axis and along the y-axis based on a point of the potential defect on the x-axis pixel grey level intensity chart and a point of the potential defect on the y-axis pixel grey level intensity chart, respectively. Thus, the distance of the defect in the image from a line of material along the x-axis and y-axis can be determined based on where the potential defect falls on the x-axis pixel grey level intensity chart and the y-axis pixel grey level intensity chart. Both the x-axis pixel grey level intensity chart and the y-axis pixel grey level intensity chart may intersect the potential defect. For example, the grey level intensity charts can measure along one pixel wide or one pixel high lines containing the potential defect.

The x-axis pixel grey level intensity chart and the y-axis pixel grey level intensity chart can include a threshold. The threshold can be used to determine what within an image a line of material is (e.g., existence of and/or a location of the line of material). For example, an image can include multiple random structures. With high frequency grey level oscillation in the image, such noise may need to be differentiated from the lines of material by the algorithm.

Determining the position of the potential defect can be relative to a center of the potential defect, an edge of the potential defect, or other parts of the potential defect.

At 104, the potential defect is classified as a DOI or a nuisance event based on the position of the potential defect, such as relative to the line of material. A DOI is a non-zero distance apart from the line of material along both the x-axis and y-axis. For example, a DOI may be between lines of material. A nuisance event is disposed on the line of material or one of the lines of material along at least one of the x-axis or the y-axis.

In an instance, if the distance between the interpolated center of the line of material and the defect exceeds 25 nm, then the defect may be considered a DOI. In this instance, it is assumed that everything occurring on the line of material is considered nuisance and only defects between the lines of material are DOI. Of course, other non-zero distances (e.g., 1 nm, 5 nm, 10 nm, or 50 nm) are possible. In another instance, the opposite classification can be applied where defects occur on or proximate to the lines of material.

A location of the metal line or lines in the image also can be determined. This may be based on peaks of the x-axis pixel grey level intensity chart and/or the y-axis pixel grey level intensity chart at one or more points along the x-axis or y-axis in the image.

Determining the position can include interpolating a location of the lines of material, interpolating a location of the potential defect, and determining a distance between the location of the lines of material and the location of the potential defect. Interpolating may include linear, bilinear, polynomial, Lagrange, spline, or sinc interpolations. The interpolating also can include a point spread function or a parabolic fit.

For example, if there are a certain number of data points g(x) with the grey level (g) as a function of the x coordinate in a grey level intensity chart. A polynomial (e.g., $f(x)=ax^3+bx^2+cx+d$) can be used so that the mean square error between f(x) and g(x) is minimal after optimizing the parameters a, b, c, and d.

Some or all of the steps of the method 100 may be performed using a processor.

In an example, the correlations are calculated within a patch image. The exact location of certain patterns (e.g., vertex, edge, or center) within the image is derived based on the projection along the x-axis and y-axis, such as using interpolation or design-based techniques. The patterns may be lines of material in the patch image.

Design-based techniques can include rendering the design clip and comparing the rendered image to the patch image to find out the offset between the two and predicting the location of the line with an acceptable degree of accuracy.

Then a location of the potential defect is calculated within the patch image using interpolation or design-based techniques. A distance between the pattern and the location of the potential defect is derived. This may be a minimal distance between the location of the pattern and the location of the potential defect. The distance between the pattern and the location of the potential defect can be used for recipe tuning. The location of the patterns can be used to derive a distance between the patterns, which also can be used for recipe tuning. This can help partition the inspected area on the wafer into different sections, such as a section where the lines are very dense and another one where the density of lines is less dense. Due to the different noise or nuisance statistics in these two sections, the cut lines which separate DOI from nuisance can be different. Having an attribute which enables those two sections to be tuned differently may increase sensitivity because a customized tuning can be applied to each of the sections.

If the distance between the location of the pattern and the location of the potential defect is within a user-defined range that qualifies as a DOI, then the potential defect is binned as a DOI. If the distance is outside the user-defined range, then the potential defect is binned as a nuisance.

Design-based alignment may be performed to enable interpolation or design-based coordinates.

Figure 2:
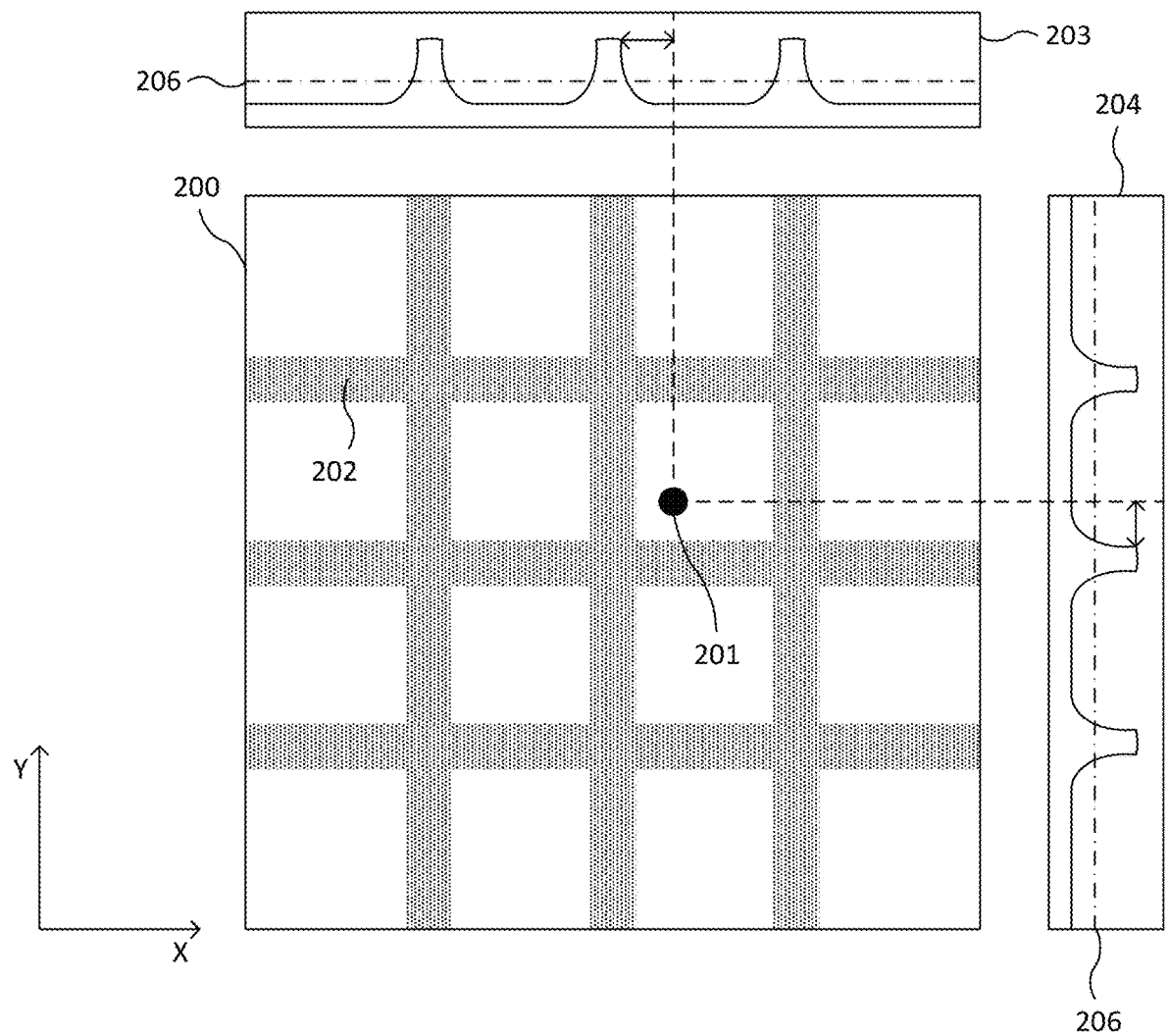
FIG. 2 is an exemplary image demonstrating an embodiment with a DOI in accordance with the present disclosure.
Figure 3:
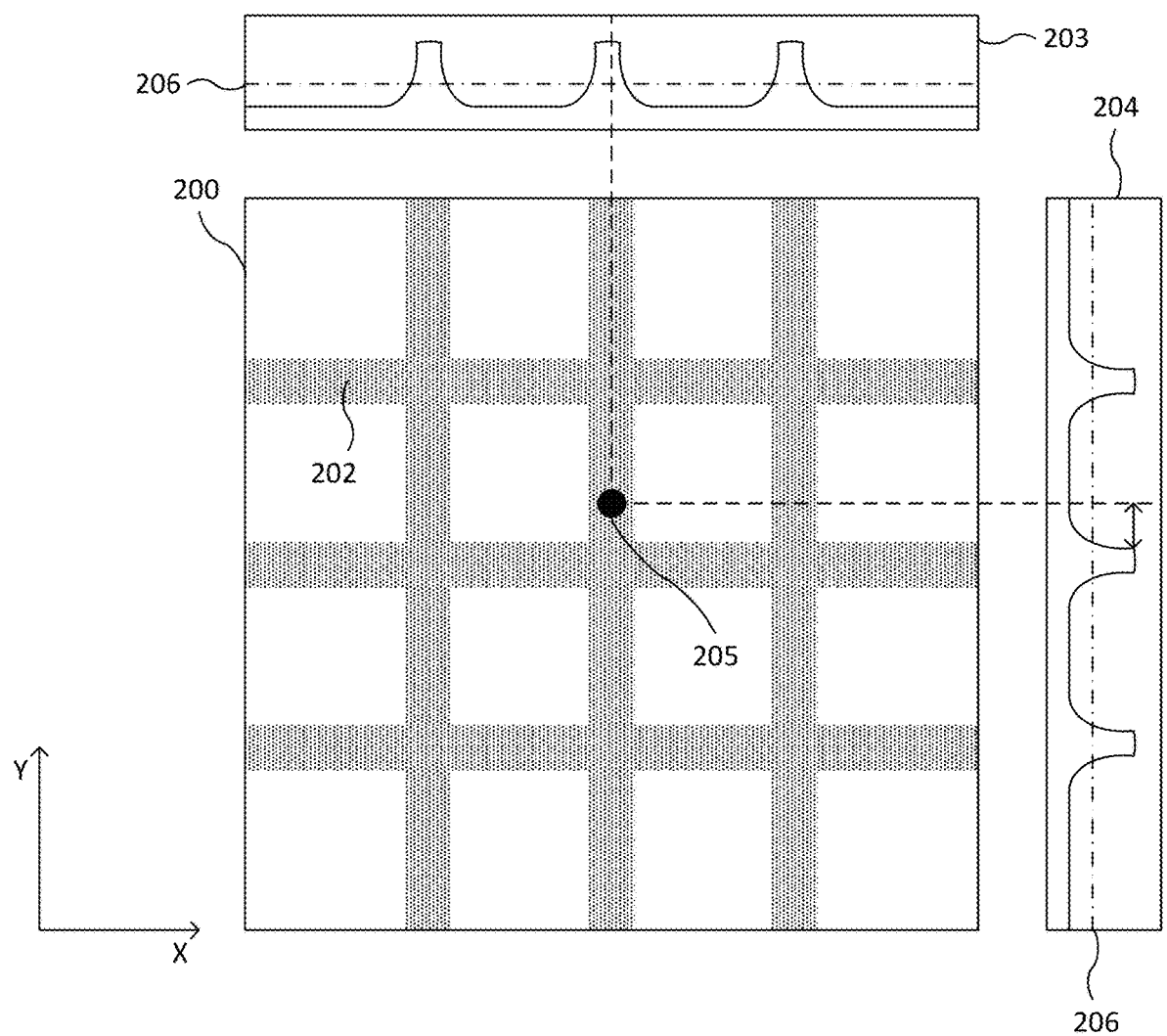
FIG. 3 is an exemplary image demonstrating an embodiment with a nuisance event in accordance with the present disclosure.

The method of FIG. 1 is illustrated in the exemplary images of FIGS. 2 and 3. FIGS. 2 and 3 may be optical patch images 200, each of which has multiple metal lines 202 extending along both the x-axis and the y-axis. The metal lines 202 are shown with hatching. FIG. 2 shows a potential defect 201 that is a DOI. FIG. 3 shows a potential defect 205 that is a nuisance event. While the images in FIGS. 2 and 3 are shown as clear, resolution limits may result in the metal lines 202 being blurry, which previously made it difficult to determine if a defect was on the metal line or not. Metal lines 202 are illustrated, but the exemplary images of FIGS. 2 and 3 are application to lines of other materials.

In the examples of FIGS. 2 and 3, pixel grey level values of an optical patch image 200 can be projected in the x-axis and the y-axis. All the defects that were detected on the metal line 202 (stripe) are considered nuisance. By interpolating the location of the metal lines 202 and the defect, an exact distance between the potential defect and one of the metal lines 202 can be calculated. A user-defined threshold can be used to separate between DOI and nuisance.

FIGS. 2 and 3 show an x-axis pixel grey level intensity chart 203 and a y-axis pixel grey intensity chart 204. Both the x-axis pixel grey level intensity chart 203 and the y-axis pixel grey intensity chart 204 include a threshold 206, which may be used to determine existence of and/or a location of the metal lines 202. Grey level intensity peaks on the x-axis pixel grey level intensity chart 203 and the y-axis pixel grey intensity chart 204 correspond to the metal lines 202 in the optical patch image 200. The x-axis pixel grey level intensity chart 203 and the y-axis pixel grey intensity chart 204 may be taken along the x-axis and y-axis, respectively, at a point that intersects the potential defect 201.

In FIG. 2, the potential defect 201 is a non-zero distance from the peaks on both the x-axis pixel grey level intensity chart 203 and the y-axis pixel grey intensity chart 204. Therefore, the potential defect 201 is classified as a DOI between the metal lines 202. In FIG. 3, the potential defect 205 is a non-zero distance from the peak on the y-axis pixel grey intensity chart 204. However, the potential defect 205 intersects a peak on the x-axis pixel grey level intensity chart 203. Therefore, the potential defect 205 is classified as a nuisance because it is on a metal line 202.

Using an embodiment disclosed herein, a position of a metal line 202 can be localized to ±10 nm or ±5 nm. A position of a defect also can be localized to ±10 nm or ±5 nm.

Figure 4:
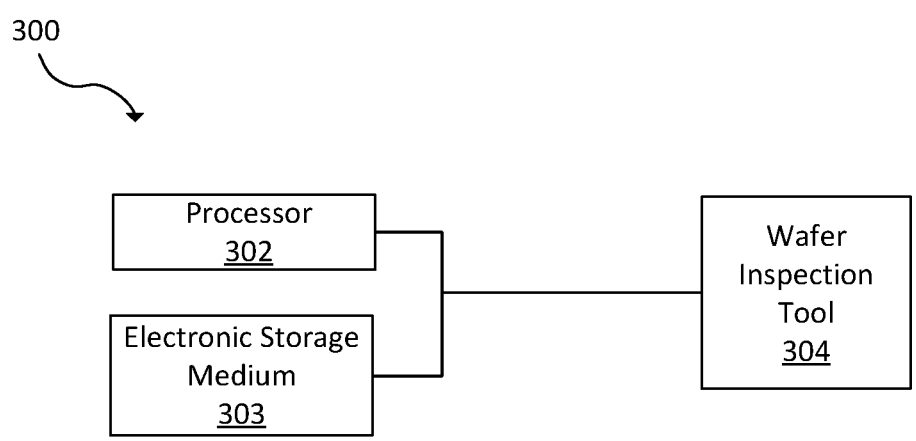
FIG. 4 is a block diagram of a system in accordance with the present disclosure.

FIG. 4 is a system drawing of a system 300. The system 300 includes a wafer inspection tool 304. The inspection tool 304 may be a scanning electron microscope (SEM). The wafer inspection tool 304 also may be a broad band plasma (BBP) tool, a laser scanning tool, an electron beam inspector, or other inspection systems. The wafer inspection tool 304 can generate one or more images used by the processor 302.

A processor 302 and an electronic storage medium 303 in electronic communication with the processor 302 are in electronic communication with the wafer inspection tool 304. The processor 302 may include a microprocessor, a microcontroller, or other devices.

The processor 302 and electronic storage medium 303 may be part of the wafer inspection tool 304 or another device. In an example, the processor 302 and electronic storage medium 303 may be part of a standalone control unit or in a centralized quality control unit. Multiple processors 302 or electronic storage medium 303 may be used.

The processor 302 may be implemented in practice by any combination of hardware, software, and firmware. Also, its functions as described herein may be performed by one unit, or divided up among different components, each of which may be implemented in turn by any combination of hardware, software and firmware. Program code or instructions for the processor 302 to implement various methods and functions may be stored in readable storage media, such as a memory in the electronic storage medium 303 or other memory.

The processor 302 may be coupled to the components of the system 300 in any suitable manner (e.g., via one or more transmission media, which may include wired and/or wireless transmission media) such that the processor 302 can receive the output generated by the system 300. The processor 302 may be configured to perform a number of functions using the output.

The processor 302, other system(s), or other subsystem(s) described herein may be part of various systems, including a personal computer system, image computer, mainframe computer system, workstation, network appliance, internet appliance, or other device. The subsystem(s) or system(s) may also include any suitable processor known in the art, such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

An additional embodiment relates to a non-transitory computer-readable medium storing program instructions executable on a processor for performing a computer-implemented defect detection or wafer inspection, as disclosed herein. In particular, the processor 302 can be coupled to a memory in the electronic storage medium 303 or other electronic data storage medium with non-transitory computer-readable medium that includes program instructions executable on the processor 302. The computer-implemented method may include any step(s) of any method(s) described herein. For example, the processor 302 may be programmed to perform some or all of the steps of FIG. 1, or other embodiments disclosed herein. The memory in the electronic storage medium 303 or other electronic data storage medium may be a storage medium such as a magnetic or optical disk, a magnetic tape, or any other suitable non-transitory computer-readable medium known in the art. In particular, the electronic data storage unit can include persistent storage, random access memory, or a split database.

The program instructions may be implemented in any of various ways, including procedure-based techniques, component-based techniques, and/or object-oriented techniques, among others. For example, the program instructions may be implemented using ActiveX controls, C++ objects, Java-Beans, Microsoft Foundation Classes (MFC), SSE (Streaming SIMD Extension), or other technologies or methodologies, as desired.

In an instance, the processor 302 receives an image of a wafer that includes a line of material, such as a metal line. The image has an x-axis and a y-axis perpendicular to the x-axis. The processor 302 is configured to execute instructions that correlate a potential defect against an x-axis pixel grey level intensity chart of the image and correlate the potential defect against a y-axis pixel grey level intensity chart of the image. Using the processor 302, a position of the potential defect relative to the line of material on the wafer is determined along the x-axis and along the y-axis based on a point of the potential defect on the x-axis pixel grey level intensity chart and a point of the potential defect on the y-axis pixel grey level intensity chart, respectively. The processor 302 classifies whether the potential defect is a DOI or a nuisance event based on the position of the potential defect. A DOI may be a non-zero distance apart from the line of material along both the x-axis and y-axis. A nuisance event may be on the line of material along at least one of the x-axis or the y-axis. Both the x-axis pixel grey level intensity chart and the y-axis pixel grey level intensity chart can include a threshold. Both the x-axis pixel grey level intensity chart and the y-axis pixel grey level intensity chart may intersect the potential defect.

The processor 302 can be further configured to execute instructions that determine a location of the line of material in the image.

The processor 302 can be further configured to execute instructions that identify the potential defect in the image.

The processor 302 can be further configured to execute instructions that generate the x-axis pixel grey level intensity chart and the y-axis pixel grey level intensity chart.

Each of the steps of the method may be performed as described herein. The methods also may include any other step(s) that can be performed by the processor and/or computer subsystem(s) or system(s) described herein. The steps can be performed by one or more computer systems, which may be configured according to any of the embodiments described herein. In addition, the methods described above may be performed by any of the system embodiments described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A method comprising:
providing an image of a wafer that includes a line of material, wherein the image has an x-axis and a y-axis perpendicular to the x-axis;
correlating, using a processor, a potential defect against an x-axis pixel grey level intensity chart of the image;
correlating, using the processor, the potential defect against a y-axis pixel grey level intensity chart of the image;
determining, using the processor, a position of the potential defect relative to the line of material on the wafer along the x-axis and along the y-axis based on a point of the potential defect on the x-axis pixel grey level intensity chart and a point of the potential defect on the y-axis pixel grey level intensity chart, respectively, wherein the determining the position includes:

interpolating a location of the line of material;
interpolating a location of the potential defect; and
determining a distance between the location of the line of material and the location of the potential defect; and
classifying, using the processor, the potential defect as a defect of interest or a nuisance event based on the position of the potential defect, wherein the defect of interest is a non-zero distance apart from the line of material along both the x-axis and y-axis, and wherein the nuisance event is on the line of material along at least one of the x-axis or the y-axis.

2. The method of claim 1, wherein both the x-axis pixel grey level intensity chart and the y-axis pixel grey level intensity chart intersect the potential defect.

3. The method of claim 1, wherein both the x-axis pixel grey level intensity chart and the y-axis pixel grey level intensity chart include a threshold, wherein the threshold determines the line of material.

4. The method of claim 1, further comprising identifying, using the processor, the potential defect in the image.

5. The method of claim 1, further comprising, determining, using the processor, a location of the line of material in the image.

6. The method of claim 1, wherein the image is 32 pixels in the x-axis and 32 pixels in the y-axis.

7. The method of claim 1, wherein determining the position is based on a center of the potential defect.

8. The method of claim 1, further comprising generating, using the processor, the x-axis pixel grey level intensity chart and the y-axis pixel grey level intensity chart.

9. The method of claim 1, wherein the line of material is a metal line.

10. A computer program product comprising a non-transitory computer readable storage medium having computer readable program embodied therewith, the computer readable program configured to carry out the method of claim 1.

11. A system comprising:
a processor in electronic communication with an electronic storage medium and a wafer inspection tool, the processor configured to execute instructions that:
correlate a potential defect against an x-axis pixel grey level intensity chart of the image of a wafer that includes a line of material, wherein the image has an x-axis and a y-axis perpendicular to the x-axis;
correlate the potential defect against a y-axis pixel grey level intensity chart of the image;
determine a position of the potential defect relative to the line of material on the wafer along the x-axis and along the y-axis based on a point of the potential defect on the x-axis pixel grey level intensity chart and a point of the potential defect on the y-axis pixel grey level intensity chart, respectively, wherein the determining the position includes:
interpolating a location of the line of material;
interpolating a location of the potential defect; and
determining a distance between the location of the line of material and the location of the potential defect; and
classify the potential defect as a defect of interest or a nuisance event based on the position of the potential defect, wherein the defect of interest is a non-zero distance apart from the line of material along both the x-axis and y-axis, and wherein the nuisance event is on the line of material along at least one of the x-axis or the y-axis.

12. The system of claim 11, wherein both the x-axis pixel grey level intensity chart and the y-axis pixel grey level intensity chart include a threshold, wherein the threshold determines the line of material.

13. The system of claim 11, wherein the processor is further configured to execute instructions that identify the potential defect in the image.

14. The system of claim 11, wherein both the x-axis pixel grey level intensity chart and the y-axis pixel grey level intensity chart intersect the potential defect.

15. The system of claim 11, wherein the processor is further configured to execute instructions that generate the x-axis pixel grey level intensity chart and the y-axis pixel grey level intensity chart.

16. The system of claim 11, wherein the line of material is a metal line.

17. The system of claim 11, wherein the processor is incorporated in the wafer inspection tool.

18. The system of claim 17, wherein the wafer inspection tool generates the image.

19. The system of claim 18, wherein the wafer inspection tool is a scanning electron microscope.

* * * * *